Oct. 25, 1966
W. G. LEVY
3,281,159
BASKET CARRIER
Filed Feb. 26, 1965
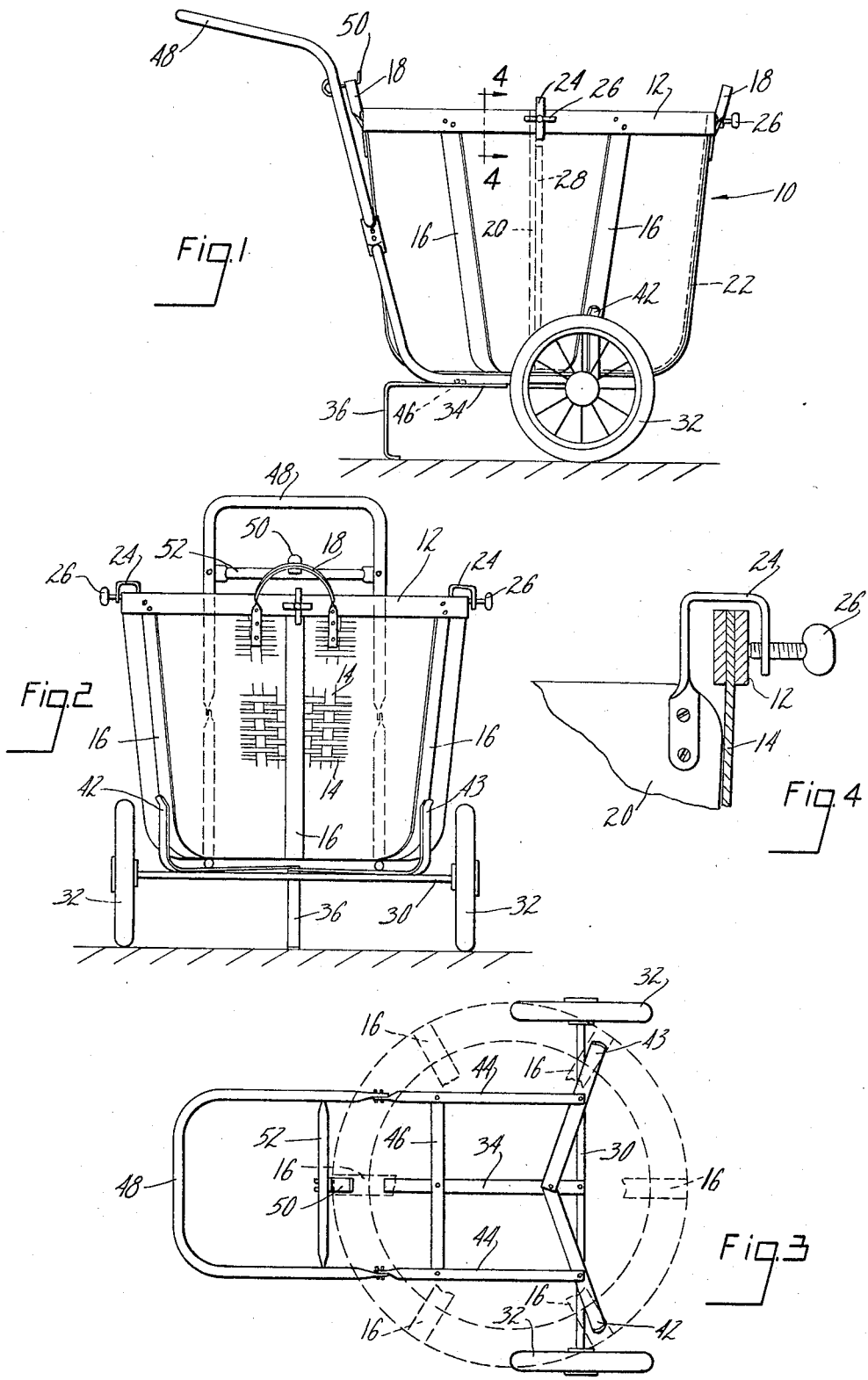

United States Patent Office 3,281,159
Patented Oct. 25, 1966

3,281,159
BASKET CARRIER
William G. Levy, P.O. Box 179, North Conway, N.H.
Filed Feb. 26, 1965, Ser. No. 435,474
2 Claims. (Cl. 280—47.26)

The present invention relates to an improved garden truck wheeled carrier, and more specifically to a garden truck wheeled carrier which comprises a large bushel-type basket and a two wheel manual carrier in which the basket is firmly cradled and supported.

It is a principal object of the invention to provide a novel and improved two-wheeled garden carrier comprising in combination with a large bushel-type basket, a light-weight skeleton frame hand truck which is particularly constructed and arranged to receive and to firmly support a bushel-type basket of the general type disclosed to provide a carrier which is of light weight, highly mobile and arranged for loading and supporting a bushel basket thereon with a minimum risk of damage to the basket.

With this and other objects in view as may hereinafter appear, the several features of the invention will be readily appreciated by one skilled in the art from the following description taken in connection with the accompanying drawing in which:

FIG. 1 is a view in side elevation of applicant's improved two-wheeled carrier and a two bushel basket in position thereon;

FIG. 2 is a view in side elevation of the two-wheeled carrier and two bushel basket mounted thereon looking from the right of FIG. 1;

FIG. 3 is a top plan view of the two-wheeled carrier of FIG. 1, the basket being shown in dot-and-dash lines; and FIG. 4 is a detail sectional view illustrating a clamping device by means of which a vertical partition within the basket is held in place.

The two-wheeled garden basket carrier illustrated in the drawing as embodying in a preferred form the several features of the invention comprises a two-bushel natural oak basket 10 of the general type having closely spaced ribs extending outwardly and upwardly from a bottom central point, terminating in a rim 12 and having woven thereon horizontally disposed flat wooden strips 14. The basket is formed with outside reinforcing ribs 16 which cross beneath the bottom center point of the basket and extend outwardly and upwardly at 60° angles from one another, being at their upper ends fastened into the rim 12. The basket is provided with two loop handles 18 attached to the rim at the locations of two diametrically opposed reinforcing ribs 16.

The basket 10 is provided with vertical partitions 20 and 22 providing three separate compartments. The partition 20 extends diametrically across the basket being secured at each side to the rim 12 by means of a bracket 24 and manually operable set screw 26 shown in detail in FIG. 4. The partition 22 extends at right angles from the middle of the partition 20 being held with relation thereto by cleats 28, and is secured to the rim 12 by means of a bracket 24 and set screw 26 similar to that shown in FIG. 4.

The two-wheeled manually operated carrier or truck provided in accordance with the invention comprises a non-rotatable axle 30 on which are mounted two rubber tired wheels 32. The axle 30 forms part of a skeleton frame which includes also a flat bar 34 attached to the middle of the axle and extending horizontally away therefrom. The outer end of the bar 34 is bent downwardly providing a foot 36. Two straps 38, 40 attached at 42 to the bar 34 extend outwardly and forwardly in opposite directions across the axle 30 being secured thereto as bracing members. Each said strap 38 and 40 is bent up- wardly at its outer end to provide side supports 42 and 43 for the basket 10. The frame further comprises a pair of parallel tubular members 44 which are attached to the axle 30 at the same points as the respective straps 38 and 40 and extend horizontally therefrom, and then upwardly, being spaced from one another to support thereon a two-bushel basket 10. A cross strap 46 is secured to the flat bar 34 and at its outer ends to the tubular members 44, rigidly securing these elements of the frame together as a unit. The upwardly extending portions of the tubular members 44 have connected thereto a U-shaped extension providing a handle 48.

The tubular shaped members 44 are spaced apart to provide a broad support for the basket 10. The upwardly extending portions thereof are spaced from the side supports 42, 43 to form a cradle within which the basket is firmly held. In order to more firmly hold the basket a hook 50 mounted on a cross member 52 of the handle extension 48 is adapted to be engaged within one of the two loop handles 18 thus further supporting the basket within the frame. When the basket 10 is positioned rotatively so that a loop handle 18 is engaged upon the hook 50 it will be observed that the heavy outside supporting ribs 16 will be correspondingly positioned so that the two such ribs located 120° to the left and to the right of the hook engaged handle 18 will be engaged with the respective side supports 42, 43. This arrangement has the advantage that those elements of the lightweight metal frame which engage with and carry the weight of the basket are in contact with only the heavy reinforcing ribs 16, and with the looped handle 18 which parts are especially constructed and arranged to carry this weight.

The fact that the basket is fitted into an exactly predetermined rotatably oriented relation to the wheeled carrier when one of the looped handles 18 is fitted over the hook causes the reinforcing ribs 16 to be engaged accurately against the supports 42, 43 and thereby greatly reduces the risk of chafing or the accidental puncturing of the woven structure through contact with some portion of the carrier frame with said supports.

The invention having been described what is claimed is:

1. A basket cart having, in combination, with a large woven natural oak basket of generally cylindrical shape having a rim, wide flat reinforcing ribs extending from a central focal point under the basket outwardly and upwardly externally thereof to said rim at 60° intervals from one another, and two loop handles attached to said rim at the location of two diametrically opposed reinforcing ribs, a hand truck supporting said basket comprising an axle and a pair of wheels rotatably mounted on said axle, a frame including a pair of parallel tubular elements attached to said axle extending horizontally and then upwardly in parallel relation terminating in a transverse handle portion, and spaced for engagement with portions of the bottom and with the side of said basket, a fastening element supported between said tubular elements adjacent said handle for engagement with the loop handle of said basket supported on said parallel tubular elements, and a pair of basket positoning elements extending over said axle on said frame and upwardly for engagement with two said reinforcing ribs disposed at 120° around said basket from said loop handle engaged by said fastening element.

2. In a basket cart comprising a large woven natural oak basket of generally cylindrical shape having a rim, wide flat reinforcing ribs extending from a central focal point under the basket outwardly and upwardly externally thereof to said rim at 60° spaced intervals about the basket, and two looped handles attached to said rim at the location of two diametrically opposed enforcing ribs, the combination of a hand truck supporting said basket comprising an axle and a pair of wheels rotatably mounted on said axle, a central strip extending horizontally from the middle of the axle having formed at the outer end a downwardly extending foot, a cross strap attached to said strip adjacent said foot, a pair of reinforcing straps extending diagonally from said strip in opposite directions across outer portions of said axle having upward extensions providing basket side supports located for engagement with upwardly extending portions of two said reinforcing ribs of said basket, a pair of spaced apart parallel tubular elements mounted on said axle and cross strap extending horizontally from said axle to said cross strap and then upwardly terminating in a transverse handle, and a fastening element supported between said tubular elements adjacent said handle for engagement within a said looped handle thereby locating said basket on said tubular members with the reinforcing ribs thereof engaged with said upwardly extending basket side supports.

References Cited by the Examiner

UNITED STATES PATENTS

| | | | |
|---|---|---|---|
| 2,504,907 | 4/1950 | Truran | 214—284 |
| 2,764,420 | 9/1956 | Morrissy | 280—47.24 |
| 2,780,476 | 2/1957 | Upchurch | 280—47.24 |

BENJAMIN HERSH, *Primary Examiner.*

J. A. PEKAR, *Assistant Examiner.*